Figure 1:
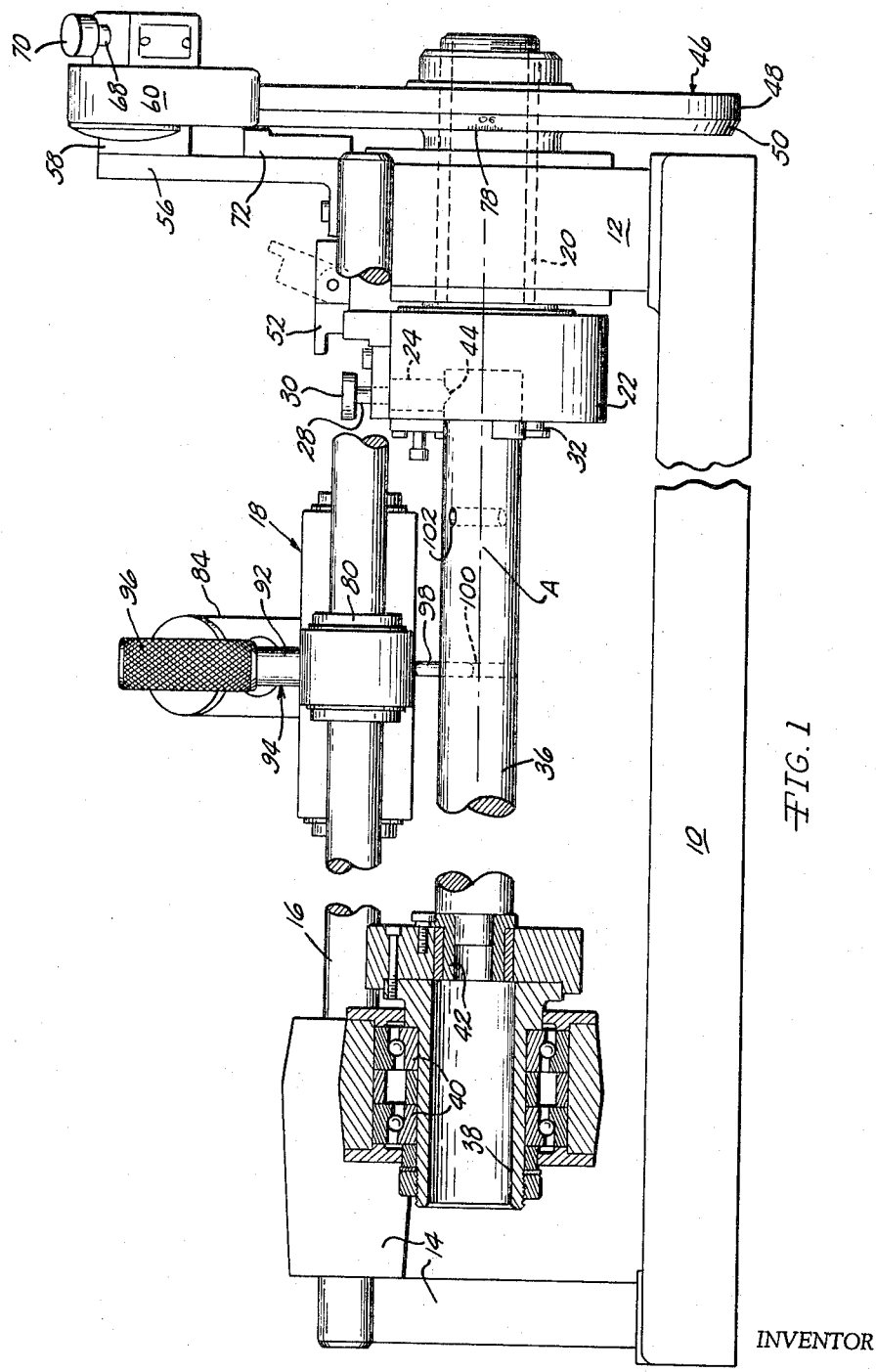

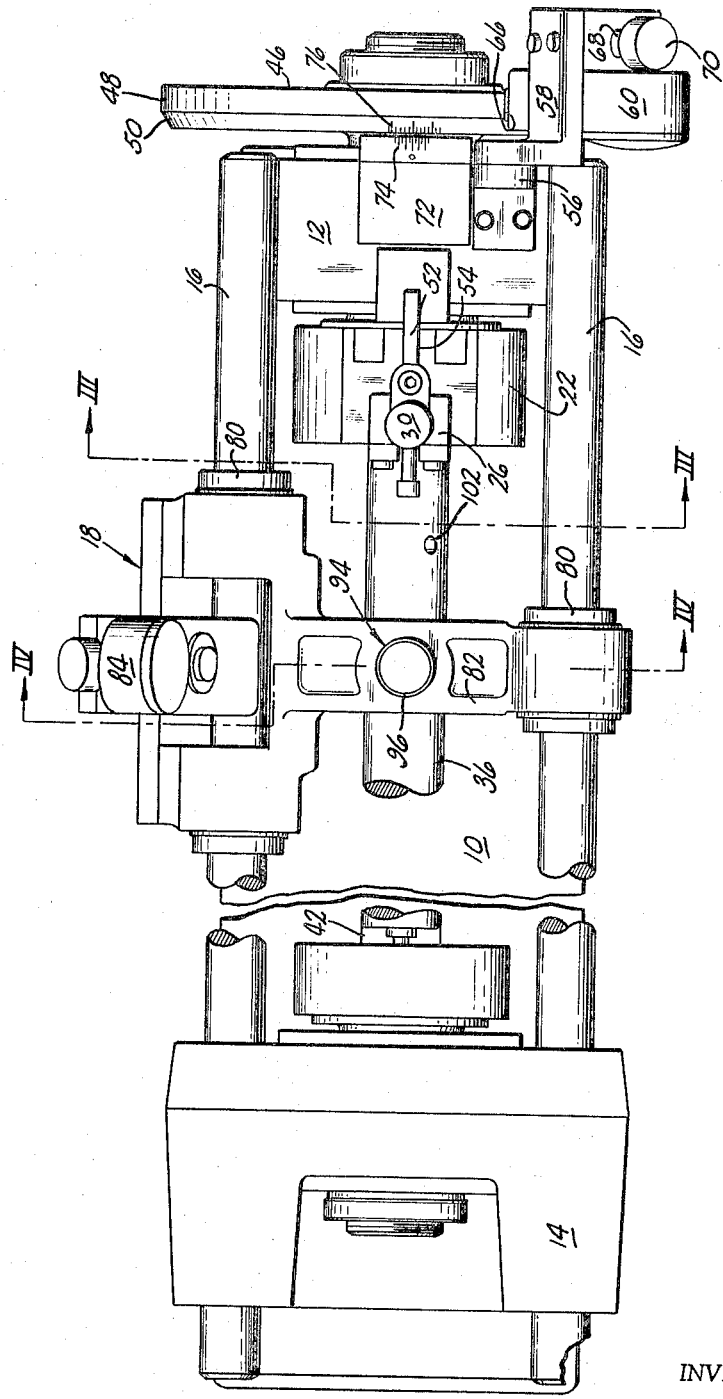

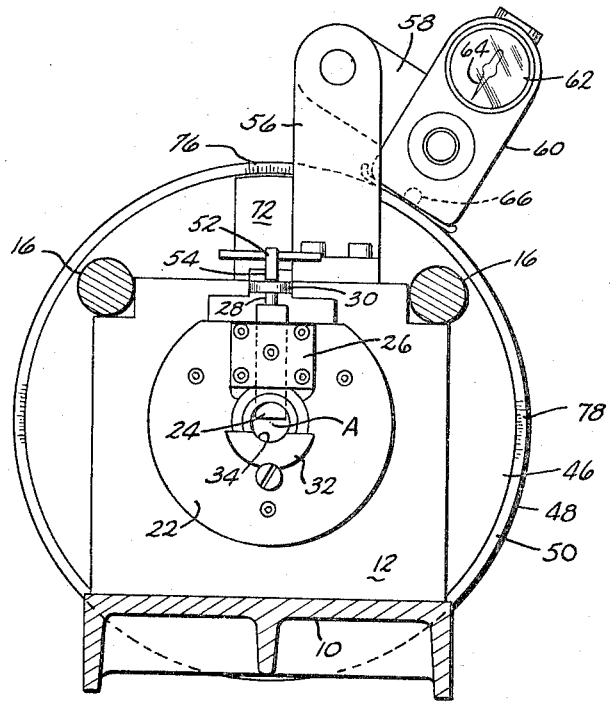

United States Patent Office 3,316,648
Patented May 2, 1967

3,316,648
LINEAR AND ANGULAR GAUGE
William Peter Klaassen, Brooklyn, Mich., assignor to Teer, Wickwire & Company, Jackson, Mich., a corporation of Michigan
Filed July 18, 1966, Ser. No. 566,060
7 Claims. (Cl. 33—174)

This application is a continuation-in-part of my copending United States application Ser. No. 398,250, filed Sept. 22, 1964, now Patent 3, 273,249.

The invention pertains to a gauge and particularly is concerned with a gauge capable of gauging linear and angularly related locations upon an article.

Diameters, external dimensions, and internal dimensions of work pieces, tools, or other articles being gauged can usually be accurately measured by use of conventional micrometers, vernier devices and the like. However, if it is desired to accurately measure the distance between holes, notches, ribs, shoulders, projections, or the like on a work piece, or other article, the measurement of such locations is often difficult and it is usually necessary to employ special measuring devices in order to produce an accurate indication of such distances. In the manufacture of elongated shafts considerable difficulty is encountered in measuring the distances between holes, notches or shoulders defined on the shaft and axially spaced thereon. Particularly, the measurement of such distances is very troublesome if the distances to be measured are in excess of the capabilities of conventional micrometers or vernier scales. Also, when measuring locations on elongated workpieces, if it is desired to accurately measure the angular deflection of holes, for instance, relative to each other about the axis of the workpiece complicated protractor devices are often required wherein the measurement is very time consuming and expensive to accomplish.

The invention pertains to a relatively inexpensive gauge which is particularly useful for measuring elongated articles whereby the linear distance between predetermined locations on the article can be very quickly measured and, also, the angular relationship of predetermined locations on the article may be quickly compared and very accurately gauged.

Another object of the invention is to provide a gauging device capable of both linear and angular measurements wherein the article to be measured may be easily placed within the gauge and the gauging operation is readily accomplished by means of direct reading dial indicators.

A further object of the invention is to provide a gauge capable of making angular measurements of a very high degree of accuracy whereby the angular measurements may be directly read from a dial indicator.

A further object of the invention is to provide a gauge capable of both linear and angular measurements of a high order of accuracy wherein predetermined locations upon the article to be gauged are engaged by a probe having a tip specially shaped to conform to the configuration of the location to be measured. The probe being of such configuration and cooperating with its supporting means in a manner which permits a plurality of probes to be readily substituted for each other in accordance with the particular configuration of the location being measured.

These and other objects of the invention arising from the details and relationships of the components of an embodiment thereof will be apparent from the following description and accompanying drawings wherein:

FIG. 1 is an elevational view of a gauge constructed in accord with the invention, portions of the tailstock structure being sectioned for purposes of illustration, FIG. 2 is a plan view of a gauge constructed in accord with the invention, FIG. 3 is an elevational sectional view of the headstock of the gauge as taken along section III—III of FIG. 2, the article being measured being omitted, and, FIG. 4 is a detailed elevational sectional view taken through the carriage and probe structure as taken along section IV—IV of FIG. 2.

The apparatus of the invention is mounted upon support means which include a bed 10. A headstock 12 is mounted upon the right end of the bed 10 and extends thereabove and a tailstock 14 extends above the other end of the bed. A pair of parallel shafts 16 extend between the headstock and tailstock in vertical spaced relation to the bed. The shafts 16 form a track for the carriage generally indicated at 18 for a purpose which will be later described.

An annular sleeve 20 is rotatably journaled within the headstock 12 upon bearings, not shown, such as of the antifriction type. The sleeve 20 defines an axis A of rotation for the article to be gauged. A chuck 22 is mounted upon the inner end of the sleeve 20 disposed toward the tailstock 14. The chuck 22 has a central opening defined therethrough and includes workpiece orientation means consisting of a radially movable slide member 24 slidably mounted within guide elements 26 mounted upon the chuck. The slide 24 is moved in a radial direction by means of a threaded shaft 28 having a knob 30 fixed thereto. The shaft 28 is threaded into a threaded bore defined upon the chuck whereby rotation of the knob 30 will radially move the slide 24. The chuck 22 also includes a centering segnment 32, FIG. 3, having a concave surface 34 defined thereon which corresponds to the configuration of the article to be gauged, in this case a cylindrical rod 36. It is to be noted that the segment 32 is disposed in a 180° relationship to the radially movable slide 24.

The tailstock 14 includes a sleeve 38 rotatably mounted therein upon antifriction bearings 40. A center 42 is mounted upon the sleeve 38 and includes article engaging means whereby the left end of the rod 36, FIG. 1, may be supported by the tailstock structure. By gripping the rod 36 in the headstock and tailstock structure it will be appreciated that the rod is rotatably mounted relative to the bed 10 and upon tightening of the slide 24 to clamp the right end of the shaft in the chuck 22, FIG. 1, between the slide and the segment 32, the rod 36 will be restrained against axial movement. If desired, the slide 24 may be received within a notch 44 or similar orientation location defined upon the rod 36.

The right end of the sleeve 20, FIG. 1, extends beyond the headstock structure 12 and a disc 46 is affixed thereon for rotation with the sleeve and the chuck 22. The disc 46 has an outer circular periphery including cylindrical portion 48 and a conical portion 50.

A locking latch 52 is pivotally mounted upon the headstock 12 for selective cooperation with a notch 54 defined in the chuck 22 whereby when the latch is pivoted into engagement with the notch, as in FIG. 1, the chuck will be held against rotation. Pivoting the latch 52 to the dotted line position of FIG. 1 will permit the chuck 22, sleeve 20 and disc 46 to be freely rotated about the axis of the sleeve.

A bracket 56 is mounted upon the upper portion of the headstock 12 and includes a portion 58 extending to the right, FIG. 1, which serves as a support for the dial indicator 60. The dial indicator 60 is of the direct reading type including a scale 62 and a needle 64. The needle 64 is drivingly connected to a roller drive wheel 66 which frictionally engages the cylindrical portion 48 of the disc 46. This type of dial indicator may be of the type such as manufactured by Southwestern Industries, Inc., known as the "Trav-A-Dial." The mounting for the dial indicator also includes adjustment means with a screw 68 and a knob 70 whereby the dial may be adjusted relative to the disc 46 to vary the frictional engagement of the drive wheel 66 with the periphery of the disc. Preferably, the diameter of the disc 46, the diameter of the drive wheel 66 and the internal gearing of the dial indicator is such that the scale 62 of the indicator will indicate degrees, minutes and seconds of rotation of the disc.

An indicating block 72 is also mounted upon the headstock 12 and includes vernier indicia 74 which is adapted to cooperate with vernier indicia 76 mounted upon the disc portion 50. It will be apparent from FIG. 1 that indicia 78 may also be mounted disc portion 50 90° relative to the "zero" location shown in FIG. 1. Such indicia aids the operation in initially orienting the apparatus and reading the dial indicator.

The carriage 18 is mounted upon the shafts 16, which define a track parallel to the axis A. The carriage 18 includes bushings 80 which accurately slidably cooperate with the associated shaft 16 and a portion 82 extends between the shafts above the rod 36 to be gauged. The carriage 18 mounts a dial indicator 84 which is similar to the dial indicator 60 and includes a driving roller 86 engaging the left shaft 16, FIG. 4, whereby movement of the carriage along the shafts 16 will be accurately indicated. The dial face of the indicator 84 is calibrated in inches whereby the linear movement of the carriage 18 in an axial direction with respect to the axis of the rod 36 may be accurately determined and directly read.

A bushing 88 is mounted in the carriage portion 82, FIG. 4, and is so positioned that the axis of the bushing bore 90 intersects the axis A. The bushing bore 90 is of a cylindrical configuration and is adapted to closely slidably receive the cylindrical guide portion 92 of a probe 94. The probe 94 includes a handle portion 96 and an article engaging tip 98. The tip 98 is preferably shaped to a configuration corresponding to the hole, notch or other element upon the article being engaged. The probe 94 may be easily withdrawn from the bore 90 of the bushing and another probe inserted therein having a different configuration tip should it be desirable to change probe tips during the measuring procedure. The aforementioned operation will be fully appreciated from the description set forth in the aforementioned patent.

In operation, the operator will place the article to be measured, i.e. the rod 36, in the center 42 such that the left end of the rod will be firmly mounted in the tailstock 14. The rod 36 includes a notch 44 in the right end and the slide 24 can fit therein and as the configuration of the surface 34 of the segment 32 is such as to correspond with the exterior configuration of the rod, and is concentric with the axis A, the rod 36 will be coaxially related to the axis of the sleeves 20 and 38.

The rod 36 includes holes 100 and 102 axially spaced thereon. Accurate measuring in an axial direction between the holes 100 and 102 is readily accomplished by means of the carriage 18 and the probe 94 associated therewith. The carriage 18 is positioned over one of the holes, 100, for instance, FIG. 1, such that the probe tip 98 may be radially lowered into the hole. The dial indicator 84 is then "zeroed." The operator then raises the probe 94 such that the tip 98 is removed from the hole and the carriage 18 is axially moved along the shafts 16 to align the probe tip 98 with the axial position of the hole 102. By pivoting the latch 52 to the dotted line position of FIG. 1 the chuck 22 and rod 36 can be rotated to coaxially align the hole 102 with the probe 94 permitting the probe tip 98 to be received within the hole 102. Thereupon, the axial distance between the hole 100 and the hole 102 may be directly read from the dial indicator 84.

As will be apparent from the drawing the holes 100 and 102 have axes angularly related to each other with respect to the axis A. If it is desired to measure the angular relationship between the axes of the holes 100 and 102 the carriage 18 is positioned such that the probe tip 98 may be received within one of the holes, such as in FIG. 1 where hole 100 is engaged. The dial indicator 60 is then zeroed. Thereupon, the probe tip 98 is withdrawn from the hole 100 and moved to an axial alignment with the hole 102. The chuck 22 and rod 36 are then rotated to relate the axis of the hole 100 coincidental with the axis of the probe 94. The probe tip 98 is then inserted into the hole 102. The degree of rotation of rod 36 which is necessary to permit the probe tip 98 to enter the hole 102 can be directly read from the dial indicator 60. Thus, a highly accurate reading of the angular relationship between the holes 100 and 102 is possible.

It is to be appreciated that in addition to holes; notches, shoulders and other predetermined locations defined upon the article to be measured may be readily gauged with the apparatus of the invention. Of course, the apparatus is not limited to gauging only elongated rod type articles. Any article which can be positioned in the chuck 22 can be gauged and the article holding means of the chuck can take a wide variety of forms to hold the type of article desired. Thus, the apparatus of the invention can be employed with a large number of articles and the size of an article which may be accommodate is primarily limited by the distance from the axis A to the bed 10 and shafts 16.

It is understood that various modifications to the invention may be apparent to those skilled in the art without departing from the spirit and scope thereof and it is intended that the invention be defined only by the following claims.

I claim:
1. A gauge for determining the angular relationship of predetermined locations relative to a given axis upon an article to be gauged comprising, in combination, support means, article holding means mounted upon said support means for rotation about a given axis adapted to hold the article to be gauged, a disc fixed relative to said article holding means for rotation therewith having a circular surface concentric to said axis, a dial indicator having a rolling drive wheel engaging said circular surface and indicating angular movement of said article holding means and disc, and article engaging means mounted upon said support means angularly fixed relative to said axis adapted to selectively engage said article predetermined locations whereby the angular relationship of said locations relative to said axis can be determined.

2. In a gauge as in claim 1 wherein said dial indicator is graduated in degrees and the angular movement of said article holding means about said axis may be directly read from said indicator.

3. In a gauge as in claim 1, said article engaging means including a bushing having a bore having an axis intersecting said given axis, and a probe slidably received within said bushing bore having an article engaging tip.

4. In a gauge as in claim 1, an elongated track defined on said support means parallel to said given axis, a carriage mounted upon said track slidably movable thereon, said article engaging means being mounted upon said carriage, and a second dial indicator mounted upon said carriage having a drive roller engaging said track whereby said second dial indicator is capable of indicating the linear distance between said article predetermined locations in the direction of said given axis.

5. In a gauge as in claim 4, said article engaging means including a bushing mounted upon said carriage having a bore having an axis intersecting said given axis and a probe slidably received within said bore having an article engaging tip whereby movement of said carriage along said track and movement of said probe within said bore permits said tip to selectively engage said article predetermined locations.

6. In a gauge as in claim 4, a tailstock mounted on said support means, a rotatable bearing mounted on said tailstock adapted to rotate concentric to said given axis, and article support means defined on said bearing whereby an elongated article may be mounted upon said article holding means and said article support means parallel to said track and rotatably supported relative to said article engaging means.

7. In a gauge as in claim 6, article orientation means defined on said article holding means adapted to axially orient the article to be gauged relative to said given axis.

No references cited.

LEONARD FORMAN, *Primary Examiner.*

J. M. FREED, *Assistant Examiner.*